United States Patent
Johnson et al.

(10) Patent No.: US 10,650,132 B1
(45) Date of Patent: *May 12, 2020

(54) EFFICIENT STARTUP AND LOGON

(71) Applicant: United Services Automobile Association (USAA), San Antonio, TX (US)

(72) Inventors: Zakery Layne Johnson, Santa Clara, UT (US); John Shelton, San Antonio, TX (US); Debra Randall Casillas, Helotes, TX (US); Thomas Bret Buckingham, Fair Oaks Ranch, TX (US); Gabriel Carlos Fernandez, San Antonio, TX (US); Sudarshan Rangarajan, San Antonio, TX (US); Maland Keith Mortensen, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/409,426

(22) Filed: May 10, 2019

Related U.S. Application Data

(63) Continuation of application No. 15/918,997, filed on Mar. 12, 2018, now Pat. No. 10,331,870, which is a continuation of application No. 15/359,089, filed on Nov. 22, 2016, now Pat. No. 9,984,224, which is a continuation of application No. 14/630,038, filed on Feb. 24, 2015, now Pat. No. 9,509,676, which is a
(Continued)

(51) Int. Cl.
*G06F 21/35* (2013.01)
*H04W 4/80* (2018.01)
*H04W 12/06* (2009.01)

(52) U.S. Cl.
CPC .............. *G06F 21/35* (2013.01); *H04W 4/80* (2018.02); *H04W 12/06* (2013.01); *G06F 2221/2111* (2013.01)

(58) Field of Classification Search
CPC ............ G06F 21/35; G06F 2221/2111; H04W 12/06; H04W 4/80
See application file for complete search history.

(56) References Cited

U.S. PATENT DOCUMENTS

| 5,131,038 A * | 7/1992 | Puhl ........................ G06F 21/35 340/5.61 |
| 5,202,929 A * | 4/1993 | Lemelson ............... G06F 21/32 340/5.74 |

(Continued)

OTHER PUBLICATIONS

U.S. Appl. No. 14/630,038, filed Feb. 24, 2014, Efficient Startup and Logon.

(Continued)

*Primary Examiner* — J. Brant Murphy
(74) *Attorney, Agent, or Firm* — Perkins Coie LLP

(57) ABSTRACT

Methods and systems for receiving a detection of a physical presence of a user and, in response, initiating a start-up process on an enterprise device according to a profile associated with the user are described. Thereafter, the system receives authentication credentials at the enterprise device and the user is granted access to the enterprise device after the authentication credentials are verified.

18 Claims, 7 Drawing Sheets

Related U.S. Application Data continuation-in-part of application No. 13/874,289, filed on Apr. 30, 2013, now Pat. No. 9,430,624.

(56) References Cited

U.S. PATENT DOCUMENTS

| | | | | |
|---|---|---|---|---|
| 6,070,240 | A * | 5/2000 | Xydis | G06F 21/35 726/17 |
| 6,189,105 | B1 * | 2/2001 | Lopes | G06F 21/35 726/20 |
| 6,209,091 | B1 * | 3/2001 | Sudia | G06F 21/40 705/76 |
| 6,774,796 | B2 * | 8/2004 | Smith | G06F 21/35 340/573.1 |
| 7,797,537 | B2 | 9/2010 | Kurita et al. | |
| 7,873,364 | B2 * | 1/2011 | Park | H04W 24/00 455/405 |
| 8,223,012 | B1 * | 7/2012 | Diem | G06Q 10/00 340/539.13 |
| 8,302,152 | B1 | 10/2012 | Hewinson | |
| 8,467,770 | B1 * | 6/2013 | Ben Ayed | H04L 63/107 455/411 |
| 8,494,576 | B1 | 7/2013 | Bye et al. | |
| 8,739,264 | B1 | 5/2014 | Eddings | |
| 8,866,586 | B2 | 10/2014 | Hayashi | |
| 9,122,866 | B1 * | 9/2015 | Kolman | G06F 21/46 |
| 9,240,886 | B1 * | 1/2016 | Allen | H04L 9/32 |
| 2004/0054711 | A1 * | 3/2004 | Multer | H04L 67/1095 709/201 |
| 2004/0054783 | A1 * | 3/2004 | Takemura | H04N 5/765 709/227 |
| 2004/0117662 | A1 * | 6/2004 | Ong | G06F 21/31 726/5 |
| 2004/0230809 | A1 * | 11/2004 | Lowensohn | G06F 21/35 713/186 |
| 2004/0232220 | A1 * | 11/2004 | Beenau | G01D 21/00 235/380 |
| 2004/0257202 | A1 * | 12/2004 | Coughlin | G06F 21/35 340/5.82 |
| 2005/0272420 | A1 * | 12/2005 | Matsuda | G06F 3/1203 455/426.2 |
| 2005/0278776 | A1 | 12/2005 | Kitagawa | |
| 2006/0005035 | A1 * | 1/2006 | Coughlin | G06F 21/35 713/182 |
| 2006/0075019 | A1 | 4/2006 | Donovan et al. | |
| 2006/0271788 | A1 * | 11/2006 | Chang | H04L 63/0853 713/182 |
| 2006/0294388 | A1 * | 12/2006 | Abraham | G06F 21/305 713/182 |
| 2007/0094374 | A1 * | 4/2007 | Karia | H04L 29/06027 709/223 |
| 2007/0155398 | A1 * | 7/2007 | Park | H04W 24/00 455/453 |
| 2008/0072064 | A1 | 3/2008 | Franchi | |
| 2008/0086770 | A1 | 4/2008 | Kulkarni et al. | |
| 2008/0109895 | A1 | 5/2008 | Janevski | |
| 2009/0037983 | A1 * | 2/2009 | Chiruvolu | G06F 21/31 726/4 |
| 2009/0117889 | A1 * | 5/2009 | Varanda | G06F 9/4418 455/418 |
| 2009/0147772 | A1 * | 6/2009 | Rao | H04L 12/1818 370/352 |
| 2009/0164772 | A1 * | 6/2009 | Karkaria | G06F 9/445 713/100 |
| 2009/0181653 | A1 | 7/2009 | Alharayeri | |
| 2009/0205030 | A1 * | 8/2009 | Ong | G06F 21/34 726/6 |
| 2009/0264070 | A1 * | 10/2009 | Lim | G06Q 30/0261 455/41.2 |
| 2009/0300168 | A1 | 12/2009 | Guo | |
| 2010/0138908 | A1 * | 6/2010 | Vennelakanti | G06F 21/33 726/11 |
| 2010/0203875 | A1 * | 8/2010 | Nishimori | H04W 76/45 455/416 |
| 2010/0250944 | A1 | 9/2010 | Suzuki | |
| 2011/0070825 | A1 * | 3/2011 | Griffin | H04B 5/0031 455/41.1 |
| 2011/0070837 | A1 * | 3/2011 | Griffin | H04B 5/0062 455/41.3 |
| 2011/0083017 | A1 * | 4/2011 | Ali | G06F 21/34 713/185 |
| 2011/0084807 | A1 * | 4/2011 | Logan | H04Q 9/00 340/10.1 |
| 2011/0215921 | A1 | 9/2011 | Ben Ayed | |
| 2011/0239278 | A1 | 9/2011 | Downey et al. | |
| 2011/0241872 | A1 * | 10/2011 | Mahaffey | H04L 41/026 340/539.13 |
| 2011/0270680 | A1 * | 11/2011 | Lim | G06Q 30/0261 705/14.58 |
| 2012/0069131 | A1 | 3/2012 | Abelow | |
| 2012/0135683 | A1 | 5/2012 | Lee et al. | |
| 2012/0197806 | A1 | 8/2012 | Hill | |
| 2012/0216292 | A1 * | 8/2012 | Richardson | H04W 12/12 726/27 |
| 2012/0256725 | A1 | 10/2012 | Hayashi | |
| 2012/0284649 | A1 | 11/2012 | Levy et al. | |
| 2013/0055346 | A1 * | 2/2013 | Singh | G06F 21/34 726/3 |
| 2013/0090140 | A1 * | 4/2013 | Morisaki | G06Q 10/06 455/466 |
| 2013/0109307 | A1 * | 5/2013 | Reisgies | H04L 63/08 455/41.1 |
| 2013/0169434 | A1 | 7/2013 | McCown | |
| 2013/0212674 | A1 * | 8/2013 | Boger | G06F 21/36 726/17 |
| 2013/0219454 | A1 | 8/2013 | Hewinson | |
| 2013/0219473 | A1 | 8/2013 | Schaefer | |
| 2013/0238540 | A1 * | 9/2013 | O'Donoghue | G06Q 99/00 706/46 |
| 2013/0263211 | A1 * | 10/2013 | Neuman | H04L 63/045 726/1 |
| 2013/0282589 | A1 | 10/2013 | Shoup et al. | |
| 2014/0181942 | A1 * | 6/2014 | Zhou | G06F 21/31 726/7 |
| 2014/0189808 | A1 * | 7/2014 | Mahaffey | H04L 63/083 726/4 |
| 2014/0215602 | A1 * | 7/2014 | Chuaprasort | G06Q 30/02 726/20 |
| 2014/0282963 | A1 * | 9/2014 | Wildermuth | H04L 63/08 726/7 |
| 2014/0344446 | A1 * | 11/2014 | Rjeili | H04L 43/04 709/224 |
| 2015/0040212 | A1 | 2/2015 | Kim et al. | |
| 2015/0046996 | A1 * | 2/2015 | Slaby | H04L 63/08 726/7 |
| 2015/0096352 | A1 * | 4/2015 | Peterson | F24F 11/30 73/31.02 |
| 2015/0172275 | A1 * | 6/2015 | Milya | H04L 63/0846 726/6 |
| 2016/0104154 | A1 * | 4/2016 | Milov | G06Q 20/4012 705/67 |

OTHER PUBLICATIONS

U.S. Appl. No. 16/402,079, filed May 2, 2019, Efficient Startup and Logon.
U.S. Appl. No. 15/993,464, filed May 30, 2018, Efficient Logon.
U.S. Appl. No. 15/918,997, filed Mar. 12, 2018, Efficient Startup and Logon.
U.S. Appl. No. 15/359,089, filed Nov. 22, 2016, Efficient Startup and Logon.
U.S. Appl. No. 15/241,182, filed Aug. 19, 2016, Efficient Logon.
U.S. Appl. No. 14/630,038, filed Feb. 24, 2015, Efficient Startup and Logon.
U.S. Appl. No. 13/874,289, filed Apr. 30, 2013, Efficient Logon.

* cited by examiner

EFFICIENT STARTUP AND LOGON

CROSS-REFERENCE TO RELATED APPLICATIONS

This is a continuation of U.S. application Ser. No. 15/918,997, filed Mar. 12, 2018, entitled "EFFICIENT STARTUP AND LOGON", now allowed, which is a continuation of U.S. application Ser. No. 15/359,089, filed Nov. 22, 2016, entitled "EFFICIENT STARTUP AND LOGON," now U.S. Pat. No. 9,984,224 issued on May 29, 2018, which is a continuation of U.S. application Ser. No. 14/630,038, filed Feb. 24, 2015, entitled "EFFICIENT STARTUP AND LOGON," now U.S. Pat. No. 9,509,676, issued on Nov. 29, 2016, which is a continuation-in-part of and claims priority to U.S. application Ser. No. 13/874,289, filed on Apr. 30, 2013, entitled "EFFICIENT LOGON," now U.S. Pat. No. 9,430,624, issued on Aug. 30, 2016, each of which are hereby incorporated by reference in their entireties for all purposes.

TECHNICAL FIELD

Various embodiments of the disclosure generally relate to authentication. More specifically, some embodiments of the disclosure relate to efficient startup and logon systems and methods.

BACKGROUND

In the area of computer security, a login or logon refers to credentials necessary to obtain access to a computer system, enterprise service (e.g., e-mail, data management systems, etc.), or other restricted area. Logging in or on is the process by which individual access to a computer system is controlled by identifying and authenticating the user through the credentials presented by the user. In many cases, the user supplies a username and a password. Depending on the level of security to the restricted area, the user may be asked to provide additional information such as a birthdate.

After a user has logged in, the computer system may automatically perform checks on the hardware and software, load device drivers, and launch programs. The user can log off when the user no longer requires access to the system. Each time a user returns, a subsequent log in may be necessary.

BRIEF DESCRIPTION OF THE DRAWINGS

Embodiments of the present disclosure will be described and explained through the use of the accompanying drawings in which.

Figure 1:
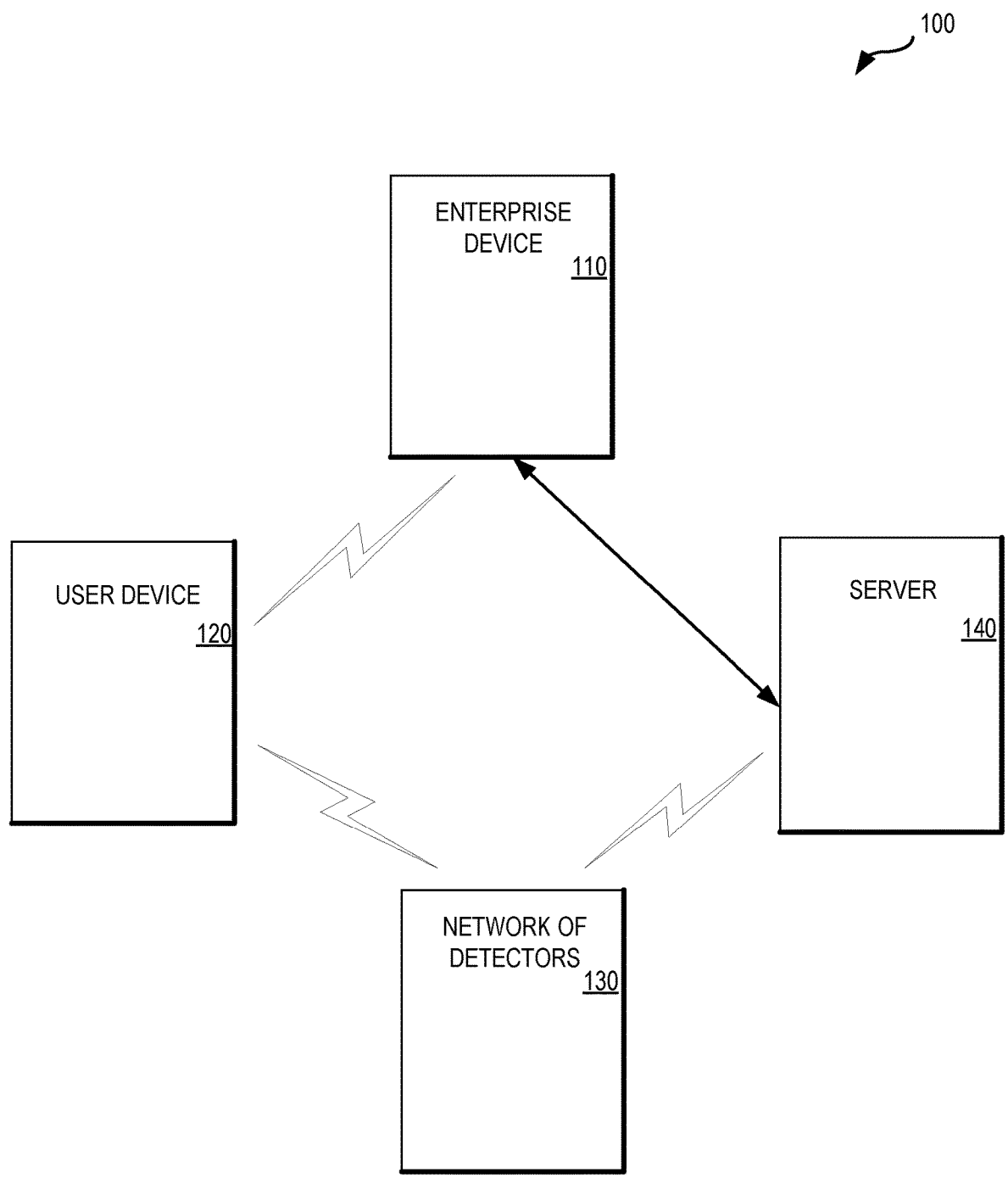
FIG. 1 illustrates an example of an environment in which some embodiments of the disclosure may be utilized.

The drawings have not necessarily been drawn to scale. For example, the dimensions of some of the elements in the figures may be expanded or reduced to help improve the understanding of the embodiments of the present disclosure. Similarly, some components and/or operations may be separated into different blocks or combined into a single block for the purposes of discussion of some of the embodiments of the present disclosure. Moreover, while the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

Various embodiments of the disclosure generally relate to authentication. More specifically, some embodiments of the disclosure relate to efficient startup and logon systems and methods.

Embodiments of the disclosure describe physical presence awareness via virtual identity. In some embodiments, a mobile device (e.g., mobile phone or RFID card) may be used to make a system virtually and wirelessly aware of the physical presence of the user to automatically initiate virtual processes on enterprise devices. The disclosure describes efficient startup and logon processes designed to reduce inefficiencies. Various embodiments may provide one or more of the following technological improvements: 1) improved efficiency in startup procedures; 2) improved authentication techniques and systems within an enterprise system; 3) improved security and confidentiality by reducing transmission of passwords, social security numbers, account numbers, and other confidential information; 4) improved user experience by removal or reduction of security prompts without loss of security; 5) reduction of employee non-productive time by improving startup processes and user authentication and verification techniques; and/or 6) improving automated user and device identification and/or verification.

Traditionally, a user provides a username and password to logon to an enterprise device and/or system. After the user is logged onto the enterprise device or system, startup processes are initialized. Initialization or startup processes may include checking hardware and software to determine whether all components are functioning properly, loading an operating system, loading device drivers, and launching startup programs. Depending on factors such as speed of the central processing unit and number of applications to load, startup processes may take a significant amount of time (e.g., several minutes) to complete before the user can begin using the device resulting in a loss of productive work time and user frustration. In some cases, the user may attempt to launch or use certain applications before the startup processes are complete, which may result in the failure of some processes to launch, an error message to the user, or simply non-responsiveness from the device.

In contrast, as described in the disclosure, start-up processes may be initialized when a physical presence of the user is detected so that when the user physically arrives at the device, the start-up processes are in process or completed. The physical presence of the user may be detected by a network of detectors. The network of detectors may include a geo-fence, a badge reader (e.g., radio frequency identification ("RFID"), near-field communications ("NFC"), Bluetooth, BlueTooth low energy (BlueTooth-LE), ultra high frequency ("UHF") or other short-range communications), a license plate reader, a biometric reader, etc. Once a physical presence of the user has been detected, the detector(s) may transmit a message to a server indicating the physical presence of the user. The server may check a profile associated with the user to determine the enterprise device(s) and the startup processes for the user and send a message to the enterprise device to begin the startup sequence. When the user arrives at the enterprise device and logs in, the enterprise device will have completed, or nearly completed, all start-up sequences and the enterprise device will be ready to use.

To detect the physical presence of the user, the system may use a series of detectors or only one detector. For example, the user may present a badge at a gate at a work environment (e.g., the badge reader is the detector). Information that the user has badged in may be sent to the server to determine the identity of the user. An additional detector may collect an image of the user's face and send the image to the server. The server may compare facial characteristics of the image with previously stored facial characteristics of the user to verify the identity of the user. Then, the server may send the startup message to the enterprise device.

In some embodiments, the detector is associated with the enterprise device (e.g., an RFID reader on the enterprise device) or the enterprise device receives the information directly from a detector (i.e., instead of receiving a message from the server) and the initialization process begins when the enterprise device detects the physical presence of the user. In some embodiments, similar processes can be used to initialize a shut-down procedure of an enterprise device of the user.

Historically, to logon to a system, enterprise service (e.g., e-mail, data management system, etc.), or other restricted website or device with a user account, such as an employee logging onto an enterprise computer system or a member of a membership organization logging onto the member's account in the membership organization system, the user types in a username and a password. After verifying that the username and password match with previous recorded information, the user is authenticated and logged onto the system.

The username/password process can be cumbersome, so much so that users sometimes fail to logoff or lock their computers while away from their computers, leaving the computer, system, and user accounts vulnerable to misuse by others. As a result, many companies automatically lock a computer and/or logoff the user after a period of inactivity to prevent unauthorized access.

In contrast, some embodiments of the present disclosure include an efficient startup and logon system that uses RFID, NFC, Bluetooth, or other short-range communications to detect that a user device is near an enterprise device (e.g., a computer, laptop, etc.), request additional authentication from the user and/or user device if desired, and log the user onto a computer system or other restricted area. In some embodiments, the user may provide information to validate the user (e.g., password), and the user device may provide information to validate the user device (e.g., digital certificate) prior to the user being logged on to the system. The requested information for authentication may include a personal identification number ("PIN"), gesture-based recognition (e.g., emotion recognition from the face or hand gesture recognition) or biometric information. Biometric information may include voice, fingerprint, retinal scan, iris scan, bioelectric signals (e.g., electrocardiogram and electroencephalogram), behavioral biometrics (e.g., time between keystrokes, the intensity of the keystrokes, etc.). A quick-logon process (e.g., using a token and/or token generator, Public-Key Infrastructure ("PKI") certificate or other digital certificate, or device fingerprint for user authentication, etc.) may be used in conjunction with the PIN, password, or biometric information.

In addition, when the user device is out of the detectable range of the enterprise device, the enterprise device may automatically log off the user, or take another action (e.g., lock the computer) depending on the time of day (e.g., lunch time) or other factors. Similarly, the enterprise device may be able to access a user's calendar to determine the appropriate action that should be taken. For example, if a calendar entry is present that indicates the user is out of the office for the rest of the day, the enterprise device may logoff the computer.

In an example, the user may be an employee approaching his/her workstation at his/her place of employment. The user, having an RFID-enabled badge, proximity device, or other device capable of sending and/or receiving short range communications may walk up to, or within a detectable range of, an enterprise device such as the user's computer workstation. The workstation may be capable of sending and/or receiving short range communications such that the workstation detects that the user is near the workstation. The user may be identified to the workstation based on the signals received by the workstation from the RFID-enabled badge, proximity device, or other user device.

In some embodiments, once the user has been identified, the user may be asked to provide further authentication. For example, the user may be asked for a PIN, password, or any other authenticating information which begins a quick-logon process to verify the user, in which case the user's device may provide a PKI certificate or token. In some embodiments, biometrics may be used to verify the user. For example, the user may simply speak and be identified by his/her voice characteristics. Upon being authenticated, the user may be automatically logged onto system, bypassing the username/password phase of typical logon sessions.

In some embodiments, an enterprise device may recognize the user device and initiate a logon process on the enterprise device. The enterprise device or the server may detect whether the user is already logged onto a second enterprise device. If so, the system may lock the second enterprise device or log the user off of the second enterprise device. In some embodiments, the user's session on the second enterprise device is transferred to the enterprise device that the user just logged in to (or is in the process of logging into).

The efficient startup and logon processes may have use in additional areas. For example, enterprises may be able to locate employees by virtue of the employee's proximity to their workstation. Employee location may be useful in times of natural disasters such as tornados, wildfires or earthquakes. It may also be useful in locating the employee when an enterprise emergency is ongoing, such as a plant shutdown, or for personal emergencies related to the employee.

While, for convenience, embodiments of the present disclosure are described with reference to workplace environment, embodiments of the present disclosure are equally applicable to various other organizations and/or user accounts with various logon requirements. For example, techniques disclosed herein may be used to logon to various websites, automated transaction machines ("ATM"), point-of-sale ("POS") devices, and other devices or systems requiring authentication. Further, embodiments may also apply to user accounts of membership organizations.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having instructions stored thereon that may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean that the particular feature, structure, or characteristic following the phrase is included in at least one embodiment of the present disclosure, and may be included in more than one embodiment of the present disclosure. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

General Description

FIG. 1 illustrates an example of an environment 100 in which some embodiments of the disclosure may be utilized.

Environment 100 includes enterprise device 110, user device 120, network of detectors 130, and server 140.

User device 120 may be any device capable of transmitting signals to the network of detectors 130 and/or enterprise device 110. User device 120 may be a mobile device, card, tablet, personal device monitor (i.e., a health monitor, body chip, or any other device monitor associated with the user), etc. In some embodiments, user device 120 exchanges short-range signals to enterprise device 110 and/or to network of detectors 130. User device 120 may include a chip or other device capable of sending and/or receiving short-range signals with network of detectors 130 and/or enterprise device 110. User device 120 may be capable of providing information to network of detectors 130 and/or enterprise device 110 to validate itself as a device.

Enterprise device 110 may be any type of device such as a computer, tablet, smartphone, ATM, POS device, etc. In some embodiments, enterprise device 110 is a corporate workstation. Enterprise device 110 may include a chip, circuitry, active reader tags, passive reader tags, or other element capable of sending and/or receiving short-range signals with user device 120, circuitry, or other device associated with user device 120. For example, enterprise device 110 may exchange communication with user device 120 via RFID or NFC. Other short-range protocols and systems can be used in some embodiments. In some embodiments, enterprise device 110 communicates with user device 120 using physical contact between user device 120 and the enterprise device 110. For example, the user may "bump" user device 120 and the enterprise device to exchange information using hardware and/or software installed on either or both devices. In some embodiments, user device 120 may be slid into the enterprise device 110 in a manner similar to a credit card machine in order to exchange data. In some embodiments, enterprise device 110 is a detector in the network of detectors 130.

Network of detectors 130 may include any type of device that detects, receives or collects information regarding the physical presence of the user. Network of detectors 130 may transmit the information regarding the physical presence of the user to server 140. In some embodiments, the information regarding the physical presence of the user may be received directly at enterprise device 110. Detectors in network of detectors 130 may include RFID readers, biometric readers, cameras, geo-fences, license plate readers, garage door sensors, BlueTooth low energy beacons, NFC readers, UHF readers (e.g., 'EZ-Pass' tag in car), among others. In some embodiments, enterprise device 110 may be a detector in the network of detectors 130. Network of detectors 130 may process information at the detector or the information may be processed by server 140.

Server 140 may exchange communication with enterprise device 110 and network of detectors 130. Server 140 may be an internal or external server and may include or access information about the user which can be used as part of the efficient startup and logon process. For example, enterprise device 110 may request a user profile, PIN, token, token generator, digital certificate, password, etc. from server 140 in authenticating a user. Information collected from the user (e.g., password) to validate the user, and information from the device, to validate the device (e.g., digital certificate) may be collected and validated during the authentication process. Server 140 may receive information from one or more detectors in the network of detectors indicating a physical presence of the user. Server 140 may process the information and send a message to enterprise device 110 to initialize the startup sequence. The message may include information about the exact startup process for the user based on the user profile.

Figure 2:
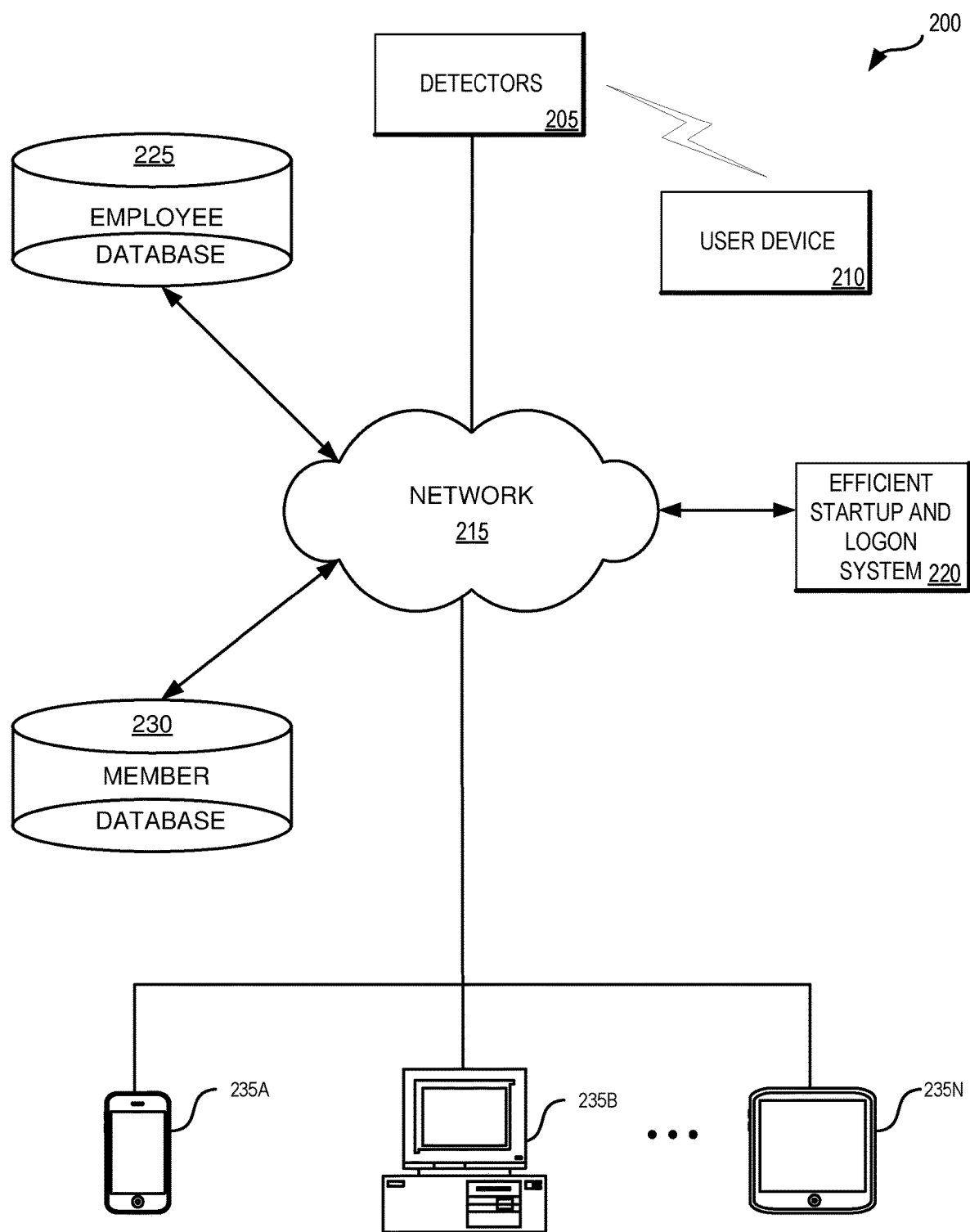
FIG. 2 illustrates an example of a network-based environment in which some embodiments of the disclosure may be utilized.

FIG. 2 illustrates an example of a network-based environment 200 in which some embodiments of the disclosure may be utilized. As illustrated in FIG. 2, network-based operating environment 200 may include detectors 205 (e.g., RFID or NFC enabled card reader, license plate scanner, garage door sensor, geo-fence, biometric reader, etc.) and user device 205 (e.g., an RFID or NFC enabled card, mobile device, tablet computer, vehicle, etc.). User device 210 and detectors 205 can include mechanisms for providing efficient startup and logon capabilities by connecting through network 215 to enterprise devices 235A-N through network 215.

Enterprise devices 235A-N may be a corporate workstation, mobile device, a mobile phone, a tablet computer, a mobile media device, a mobile gaming device, a vehicle-based computer, a dedicated terminal, a public terminal, a kiosk, desktop computer, laptop computer, etc. Enterprise devices 235A-N may run one or more applications or clients that allow a user to interact with the network 215. Such applications may provide access to an efficient startup and logon system 220, employee database 225, and member database 230. In addition, detectors 205 and enterprise devices 235A-N can include network communication components that enable user device 210 to communicate with network 215 or other electronic devices by transmitting and receiving wireless signals using licensed, semi-licensed or unlicensed spectrum over network 215. In some embodiments, enterprise devices 235A-N may be a detector in detectors 205. When enterprise devices 235A-N are detectors 205, enterprise devices 235A-N can communicate with efficient startup and logon system 220 to begin startup and logon processes prior to the user logging onto the system.

In some cases, network 215 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. Network 215 can also include third-party communication networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network, or other communications network.

As illustrated in FIG. 2, efficient startup and logon system 220 and enterprise devices 235A-N can be communicably coupled through network 215 to one or more databases such as employee database 225 and member database 230. These databases can have a variety of information that can be used by efficient startup and logon system 220. For example, employee database 225 can include employee information such as user profiles, passwords, token generators or serial numbers, usernames, PINs, etc. Member database 230 may include similar information for members or users, as well as additional information pertaining to members or users. In some embodiments, these two databases can be integrated into one database. A computer system associated with efficient startup and logon system 220 and/or enterprise device 235A-N may be able to access these (and other) databases for account information, employee/member information, and other stored information.

Efficient startup and logon system 220 may include components capable of receiving information from detectors 205, determining an identity of the user device based on the information, determining a location of the user, identifying user preferences of the user relating to startup processes and login sequences, sending a message to enterprise devices 235A-N to begin startup processes, and notifying the user of the status of an enterprise device. For example, detectors 205 may be a geo-fence and may detect that the user is approaching or arriving at a workplace when a user device enters into the geo-fenced area (e.g., by detecting signals from user device 210). Detectors 205 may communicate the user's presence and/or location to efficient startup and logon system 220 via network 215. Efficient startup and logon system 220 may identify the user based on the information and instruct enterprise devices 235A-N through network 215 to initiate startup processes so that the startup processes will be completed, or nearly completed, when the user arrives at the enterprise devices 235A-N. In some embodiments, efficient startup and logon system 220 may reference a user profile to determine the particular startup processes associated with the user. In some embodiments, the user can select whether to enable the efficient startup procedures. Once the startup sequence has begun and/or is finished, efficient startup and logon system 220 may notify the user with the status of the startup processes.

Efficient startup and logon system 220 may further receive signals from user device 210 (or multiple user devices) into enterprise devices 235A-N, determine the identity of the user device based on the signals, request and receive additional information to verify the identity of the user, and validate the user. In some embodiments, additional authentication may be requested of a user upon detecting a signal from user device 210. In some embodiments, more than one user may be detected within a vicinity of the enterprise device. Additional authentication may assist in identifying the user from a group of users within the vicinity of the device that should be logged on.

In other embodiments, additional information such as proximity to the point of interaction (e.g., by a video camera, signal strength, etc.), length of time near a point of interaction, prior use history, relative user locations, voice recognition, and other factors can be used to automatically anticipate which user should be logged on. In an example, the user device or user detected by signal strength or by video camera to be the closest user or user device in proximity to the enterprise device may be selected from the plurality of users or user devices detected. In an additional example, a user's voice may be detected, and the user may be selected based on the user's voice. In some embodiments, the user's voice not only provides a means for selection, but also provides authenticating information to the enterprise device. Accordingly, in some embodiments, the enterprise device identifies the user separately from the user device (or in combination) to initiate the efficient startup and logon process.

In a further example, if two user devices are detected by an enterprise device and one of the user profiles associated with one of the user devices indicates that the enterprise device is the primary enterprise device (e.g., a computer in the user's office) associated with that user device, then that user device may automatically be assumed to be the user logging into the system. In some embodiments, when more than one user device is detected, a list of the users or user devices may be listed on the enterprise device and the user may select which user or user device should be logged on. Still yet, in some embodiments, when only one user is present, the system may request additional authentication.

In some embodiments, a third party server may be communicably coupled to network 215 and may interact with efficient startup and logon system 220 in validating the user. For example, the third party server may provide or verify tokens used during the logon process.

Figure 3:
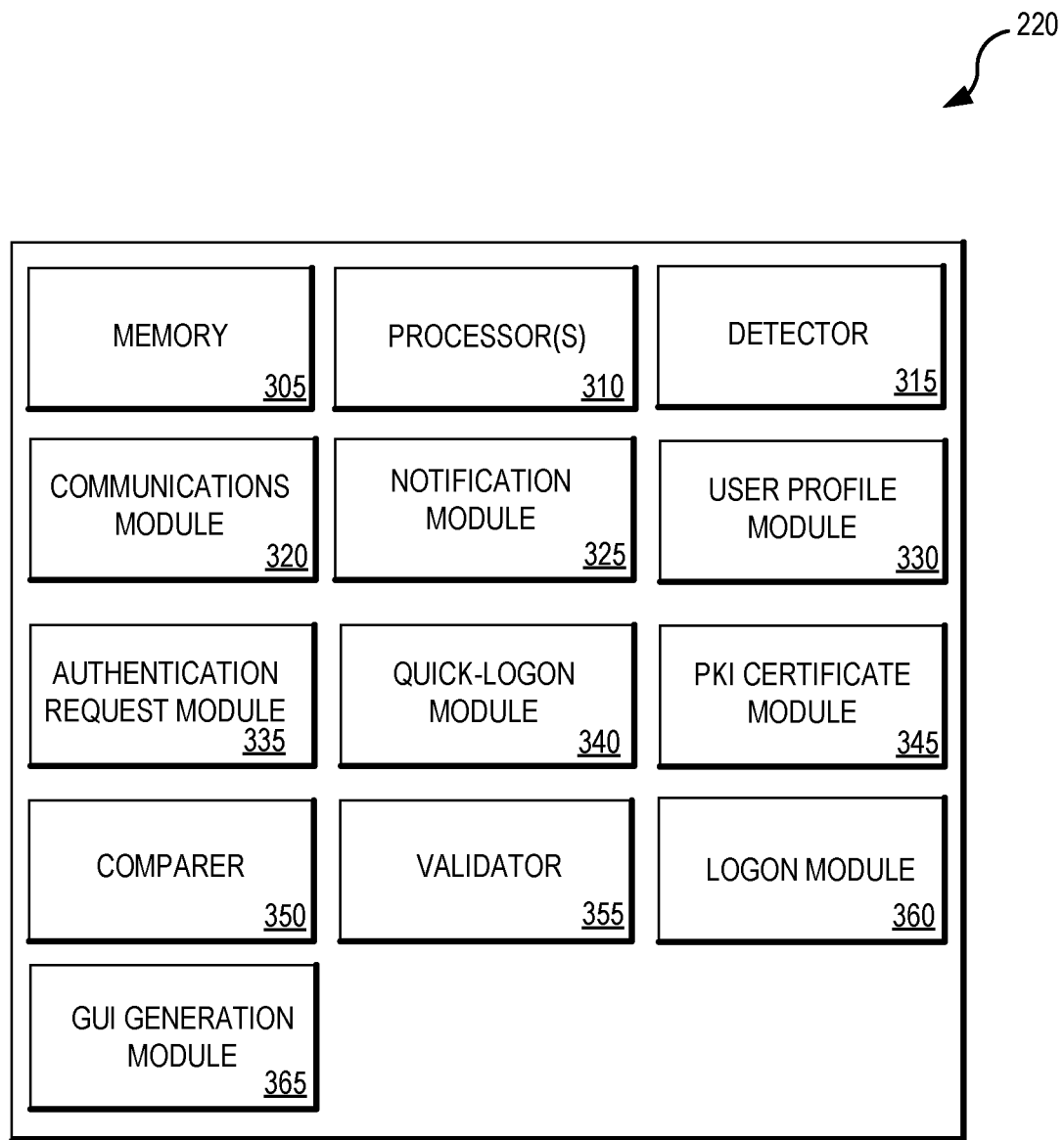
FIG. 3 illustrates components of an efficient startup and logon system in accordance with one or more embodiments of the disclosure.

FIG. 3 illustrates components of efficient startup and logon system 220 in accordance with one or more embodiments of the present disclosure. According to the embodiments shown in FIG. 3, efficient startup and logon system 220 can include memory 305, one or more processors 310, detector 315, communications module 320, notification module 325, user profile module 330, authentication request module 335, quick-logon module 340, PKI certificate module 345, comparer 350, validator 355, logon module 360, and graphical user interface (GUI) generation module 365. Other embodiments of the present disclosure may include some, all, or none of these modules and components along with other modules, applications, and/or components. Further, some embodiments may incorporate two or more of these modules and components into a single module, and/or associate a portion of the functionality of one or more of these modules with a different module. For example, in one embodiment, validator 355 and logon module 360 can be combined into a single module for validating and logging users onto the system.

Memory 305 can be any device, mechanism, or populated data structure used for storing information. In accordance with some embodiments of the present disclosure, memory 305 can encompass any type of, but is not limited to, volatile memory, nonvolatile memory and dynamic memory. For example, memory 305 can be random access memory, memory storage devices, optical memory devices, magnetic media, floppy disks, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, memory 305 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 305.

Memory 305 may be used to store instructions for running one or more applications or modules on processor(s) 310. For example, memory 305 could be used in one or more embodiments to house all or some of the instructions needed to execute the functionality of detector 315, communications module 320, notification module 325, user profile module 330, authentication request module 335, quick-logon module 340, PKI certificate module 345, comparer 350, validator 355, logon module 360, and GUI generation module 365.

Detector 315 can be configured to assist with both the initialization process of an enterprise device and the logon process of the enterprise device. In assisting with the initialization process, detector 315 can be configured to detect the physical presence of the user. Detector 315 can be a detector in a network of detectors. Examples of detector 315 may include one or more of a geo-fence, an RFID scanner or reader, a biometric reader, a camera, a video camera, a credit card reader, a garage door sensor, a license plate reader, a sensor in an enterprise device, a BlueTooth-LE beacon, an NFC reader, a UHF reader, or others. After detector 315 detects a physical presence of the user (e.g., user swipes a badge), detector 315 communicates the information to communications module 320.

In assisting with the logon process, detector 315 can be configured to detect and/or receive signals when a user device such as user device 205 is within a detectable radius or distance of detector 315. The radius or distance may be centimeters or a much larger distance depending on the type of detector and the technology or protocol used. In some embodiments, more than one user device may be detected at one time and further actions may be taken to determine which user is attempting to logon. Detector 315 may be a chip having identity protection technology (e.g., an IPT chip made by Intel®). Detector 315 may be integrated with an enterprise device 235A-N or personal computer. The signals may be near-field communications, Bluetooth protocol, Zig-Bee, or any other types of signals used within a personal area network. In some embodiments, the user device may be detected by physical contact such as by physically contacting a user device and the enterprise device (e.g., bumping). The signal may contain information (e.g., a unique identifier) that can be provided to user profile module 330 to determine an initial identity of the user device 210. The signals may provide additional authenticating information such as a PKI certificate or a token generated from a token generator associated with the user device.

Communications module 320 may be configured to receive information from detector 315, process the information, and communicate an initialization message to one or more enterprise devices. For example, communications module 320 may receive a message from detector 315 indicating a license plate number from a vehicle that entered a gate onto a campus. Communications module 320 may determine an identity of the user from the license plate number. After the user's identity is determined, communications module 320 may send a message to an enterprise device associated with the user instructing the enterprise device to begin the startup process. Communications module 320 may communicate with user profile module 330 to determine the exact startup process for the user. In some embodiments, communications module 320 may determine whether the enterprise device is in use by the user or another user or whether the startup process has been completed. If so, communications module 320 may send a message to notification module 325 to notify the user.

In some embodiments, communications module 320 reviews a calendar of the user and determines which enterprise device(s) should be initiated. For example, if a user calendar indicates that the user has a meeting in a conference room near the time the user's presence has been detected and the user is a meeting organizer, communications module 320 may send a message to the enterprise device in the conference room indicated on the user's calendar to begin the initialization process in addition to or instead of the typical enterprise device associated with the user. In some embodiments, communications module 320 may open any documents attached to the calendar meeting. In some embodiments, no initialization message will be sent if the user has indicated in the user profile a preference of no initialization.

Communications module 320 may be further configured to process information received from detector 315. For example, detector 315 may send an image of the user to communications module 320. Communications module 320 may extract characteristics of the user's image and compare the characteristics with characteristics previously extracted for the user to determine the identity of the user or to verify the identity of the user. In some embodiments, communications module 320 receives information from detector 315 indicating that the user is leaving the premises (e.g., user badges out, user's license plate is detected leaving workplace). Such indication may trigger communications module to send a message to an enterprise device associated with the user to determine whether the enterprise device has been properly logged off. If not, communications module may provide instructions to the enterprise device to begin logoff or shut down procedures. Sending the message to the enterprise device may be based on preferences in the user profile (e.g., preferences to shut down the enterprise device every evening after 7 p.m.).

Notification module 325 can be configured to notify the user of the status of the enterprise device startup processes. For example, when communications module 320 instructs the enterprise device to begin the startup processes and/or when the startup processes are completed, a push notification, text message, email, etc. could be sent to a user device. Notifications may also be sent if a procedure to logoff or shut down an enterprise device associated with the user has begun and/or completed. Notification preferences could be defined in the user profile and sent accordingly.

User profile module 330 can be configured to receive information from communications module 320 and/or detector 315 and access a user profile for the user based on the information. The user profile may include an identity of the enterprise device(s) to initialize for the user, as well as the particular startup process to be initiated for each enterprise device. The user profile may further specify shut down or logoff procedures for the user. User profiles may further include information relating to the user such as the user's commute time, accesses, a level of authentication, user preferences, the type of information required for the user to be authenticated, identifying information such as voice biometrics, fingerprints, PINs, answers to security questions, employee or member identification numbers, and other information. User profile module 330 may provide user profile information to authentication request module 335.

Authentication request module 335 may receive information relating to the user from user profile module 330 and request additional information from the user to authenticate the user. The type of information may depend on the security level associated with the user. In some embodiments, the user will be requested to provide a PIN, password, or other authenticating information, which may begin a quick-logon process using a token and/or token generator initiated by quick-logon module 340, or the PIN may begin used to initiate a quick-logon process using a PKI digital certification by PKI certificate module 345. In some embodiments, the token, token generator, and PKI certificate can be used in combination. In other embodiments, authentication request module 335 may request identifying information which is compared with previously provided information by comparer 350.

Quick-logon module 340 can be configured to receive a PIN or other identifier from a user and initiate a process to authenticate the user. Several methods for quick-logon may be used. In some examples, a token generator and a secret shared key are used; in other examples, a token generator is not used. In some embodiments, the quick-logon process uses a PKI certificate to authenticate the user.

Quick-Logon Installation Process Example

In some embodiments, as part of the efficient startup and logon process, various quick-logon techniques and components may be installed using several steps. For example, in some embodiments, a user may be asked if the user desires to install quick-logon to reduce the amount of time and effort it takes the user to logon. Quick-logon may be installed on an enterprise device and used to log a user onto an enterprise system, or quick-logon may be installed on a personal computer to log a user onto a user account via a web browser.

The quick-logon installation process may begin by collecting information to create a device fingerprint, or collecting the actual device fingerprint of the enterprise device. A device fingerprint of the device may be created by running software on the device or installing an application. This information or the device fingerprint may be stored at the enterprise.

The device fingerprint may be associated with the user in the enterprise server using identifying information provided by the user prior to quick-logon installation or at the time of the installation. A newly-created or pre-existing user identification/member identification number may be used to associate the user with the device fingerprint. Although the device fingerprint may not be completely unique to the device, it can be used as one identifying factor when authenticating the user. The device fingerprint provides assurance, at least to a certain threshold, that the enterprise server can recognize when portions of the system are compromised and access is attempted from a different device.

In some embodiments, such as where the user logs into a user account via a web browser, a secure browsing solution may be installed on the device with a client side executable.

Next, during installation, a token generator is associated with the user, and a shared secret key associated with the token generator may be embedded and installed on the device. Each token generator can have an activation code, a serial number, and a shared secret key associated with it.

In some examples, the enterprise server requests an activation code for the token generator from a third party, such as from a third party server. The third party server provides the activation code for the token generator to the enterprise server. The enterprise server then provides the activation code to the device. Upon receiving the activation code, the device provides the activation code to the third party server and requests the shared secret key and the serial number for the token generator. The third party server receives the activation code from the device and returns the shared secret key and serial number associated with the token generator to the enterprise device. The enterprise server associates the token generator serial number with the user, such as by associating the serial number with a user identification number.

In some embodiments, during the quick-logon process, the shared secret key, in combination with a time stamp, is provided to the token generator upon logon to generate a one-time code. The one-time code is time-sensitive, meaning that the code provided by the token generator is different depending on the time stamp that the token generator has provided. The shared secret key is generally not provided to the enterprise server. During installation, the shared secret key is encrypted and stored on the enterprise device. In some embodiments, the shared secret key is encrypted with information including, but not limited to, the user's PIN, password or other authenticating information. At this point, registration is complete and the user may be granted access to the account.

In some embodiments, upon completion of registration or upon logout, if the token generator was installed during or after registration, then the token generator can be removed from the device and reinstalled each time the user uses the quick-logon system, providing an extra layer of security.

Upon next logon on the device, the quick-logon page may be presented to the user, and the user may be prompted to provide a PIN, password, or other authenticating information to logon.

In some embodiments, the functionality of the token generator may be replaced with or used in addition to a secure or obfuscated key that represents the device. During installation, the enterprise server may install a securely or obfuscated key on the device. This key would be static, unlike the codes that are generated from the token generator. During quick-logon, the key may be verified by the enterprise server. The identifier may be associated on the server side with the user such as with a user identification number. Or the identifier may be associated with the device. Thus, the identifier may be per user or per machine. The key may be stored in any manner on the enterprise device known to those skilled in the art, such as in a secure key ring.

Quick-Logon Use Example

In some embodiments, after installation and during use, the quick-logon process includes only one step for the user—to input a PIN or other simple identifier—but several steps may occur in the background. For example, after the quick-logon is installed on a device, a quick-logon process begins with a request from the enterprise device to access the enterprise server (e.g., after a user device such as a mobile phone or an RFID card has been detected or after a user browses to a certain webpage). The enterprise server collects, analyzes and stores information about the enterprise device. Detecting that the enterprise device has been registered for quick-logon, the user is asked to input a PIN or other information. The PIN or other requested information is sent to the enterprise server.

A token generator associated with the user downloaded on the enterprise device generates a one-time code. If the token generator was previously removed, the device downloads the token generator associated with the user from the enterprise server. The token generator is configured to generate different codes depending upon the time stamp.

To generate such a one-time code, the token generator uses a shared secret key that was encrypted and embedded on the device during the installation process, in addition to a time stamp. Various pieces of information or data may be used to decrypt the shared secret key. For example, in some embodiments, the user's PIN may be used to decrypt the shared secret key. In some embodiments, the decrypted shared secret key and a time stamp are provided to the token generator and the one-time code is generated. The one-time code and time stamp are sent to the server.

The server may then validate the user with the various pieces of information. For example, the server may validate the user's PIN or other identifier, the device configuration and the one-time code. The server may also perform checks to determine if the secure browser is enabled. To validate the one-time code, the server may match the one-time code with the token generator serial number associated with the user. The one-time code, time stamp, and token generator serial number are sent from the server to the third party where third party validation of the one-time code is requested. Using the time-stamp of the one-time code, and the token generator serial number, the third party server validates the one-time code. If the third party server verifies the user to a certain level, the user may be authenticated, which information is provided to validator 355.

Accordingly, using quick-logon, the user is asked to provide a PIN (or other information), and the user may be authenticated.

PKI certificate module 345 can be configured to receive a user PIN or other identifying information in response to a request from authentication request module 335 and authenticate the user with a PKI certificate associated with the user. Thus, the process of authenticating the user may be similar to the quick-logon process described above with the PKI certificate replacing (or used in combination with) the token and token generator. For example, the user may provide the PIN or other identifying information to the enterprise device, the user device may provide the PKI certificate to the enterprise device or to a third party to verify the user's PIN (or other identifier) and PKI certificate. In some embodiments, the enterprise device or system verifies the user. In other embodiments, the user's PKI certificate or PIN (or other identifier) is provided to a third party, either directly by the user device or by the enterprise device to a third party for verification.

Comparer 350 is configured to compare information provided by the user in response to the authentication request. For example, if the user is authenticated by speaking a particular code word, both by the word and by the user's voice, comparer 350 compares the user's voice and code word to ensure there is a match with the stored voice and code word.

Validator 355 is configured to validate the user when comparer 350 compares information provided by the user or when the quick-logon process has been completed. Validator 355 may indicate to logon module 360 that the user has been authenticated and the user may now be logged on. Logon module 360 is configured to log the user onto the enterprise device after receiving information that the user has been validated by validator 355.

GUI generation module 365 can generate one or more GUI screens that allow for interaction with a user. In at least one embodiment, GUI generation module 365 generates a graphical user interface notifying the user of a status of the initialization process or allowing a user to enter a PIN, password, or other identifier, or request other information. GUI generation module 365 may also generate a graphical user interface allowing the user to set preferences, present reports, review notification, and/or otherwise receive or convey information to the user.

Figure 4:
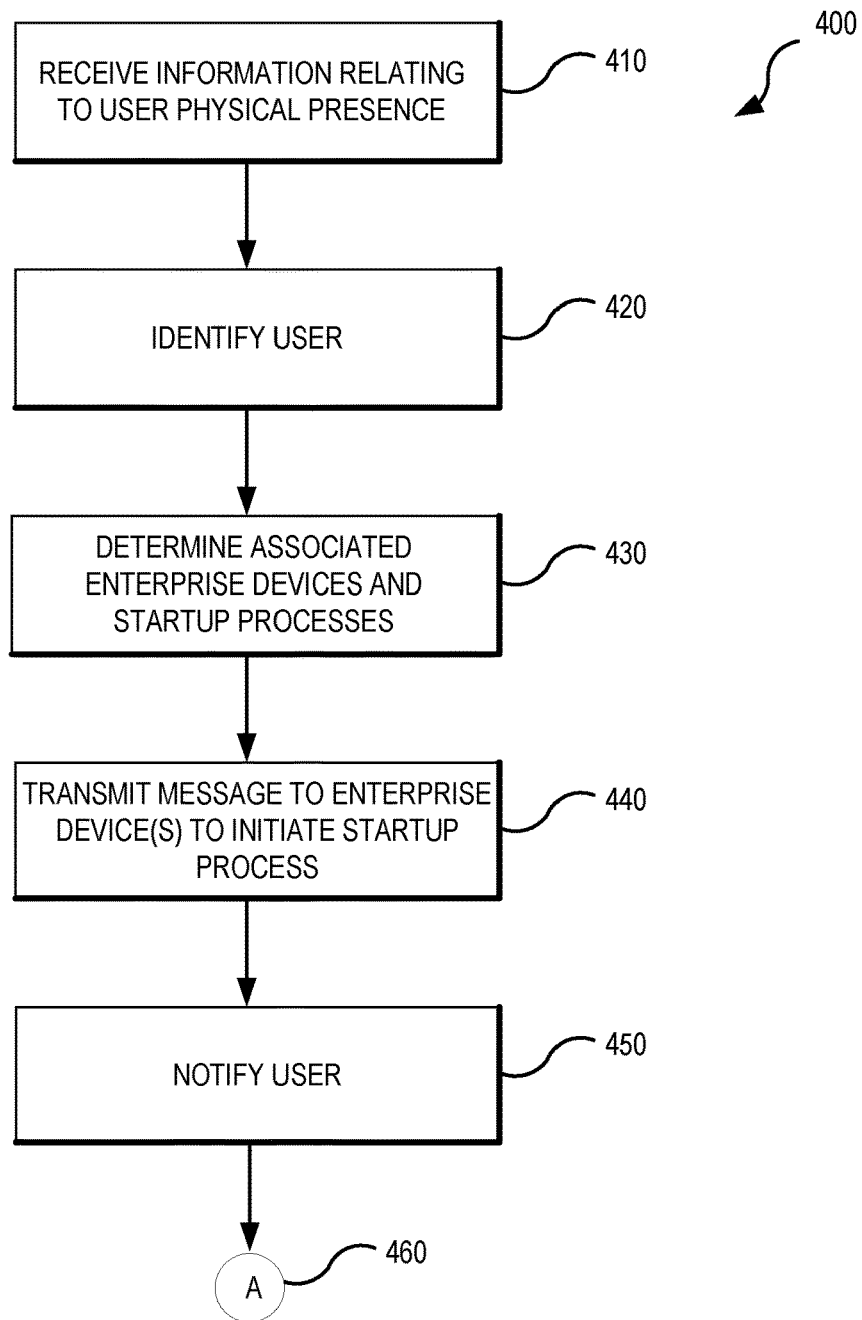
FIG. 4 is a flowchart illustrating a set of operations for initializing an enterprise device of a user in accordance with various embodiments of the present disclosure.

FIG. 4 is a flowchart illustrating a set of operations for initializing an enterprise device of a user in accordance with various embodiments of the present disclosure. The operations can be performed by various components such as one or more processors 310, detector 315, communications module 320, notification module 325, user profile module 330, GUI generation module 365, employee database 225, enterprise devices 235A-N, user device 210, efficient startup and logon system 220, and/or other components.

Receiving operation 410 receives information related to the physical presence of a user at a system server. For example, a detector may detect the presence of the user by scanning a badge of the user, detecting a location of the user's mobile device, or other detection methods. In some embodiments, a second or third detector may collect additional information relating to the user to assist with identification or verification of the user's identity (e.g., biometric information may be collected). Identifying operation 420 identifies the user based on the information received.

After the user is identified, determining operation 430 determines enterprise devices and startup processes associated with the user. Determining operation 430 may retrieve this information from a user profile. For example, the user may have several associated enterprise devices, but the user profile indicates that only one of the enterprise device is to be initiated upon detection of the user. Further, the user may have identified certain startup procedures.

Next, transmitting operation 440 transmits a message to the enterprise device(s) to begin startup processes. This may include hardware checks, software checks, an operating system startup, applications initialization, etc. Once the startup procedures have completed, the enterprise device may be locked and waiting for the user to provide authentication credentials. If the user arrives prior to the startup procedures completing, the user may still provide logon information and be authenticated; the startup processes will complete when the user is logged in. Notifying operation 450 notifies the user that the startup procedures have begun and/or are completed. The logon process may be continued in FIG. 5 with continuing operation 460.

The following examples are specific examples of the operations in FIG. 4. Other examples are contemplated.

A garage door sensor may sense when a garage at a user's residence is raised to detect when the user is leaving for work. The garage door sensor transmits a garage door up message to the enterprise server. In response, the enterprise server may send a message to an enterprise device associated with the user to begin the startup process. In some embodiments, depending on the user's commute time, the enterprise server may send the message after a period of time (or indicate a period of time to wait before starting the startup processes in the message).

A license plate reader may be placed by a company garage or a guard station. When a license plate is read (or an image of the license plate is captured), the information may be sent to the enterprise server. The enterprise server may analyze an image of the license plate or the license plate numbers. The enterprise server may determine an identity of the user using the license plate information. The enterprise server may then contact the enterprise device to initiate the startup process. In some embodiments, an RFID sensor or other detector may detect the vehicle and send the information collected from the vehicle to the enterprise server. In some embodiments, the license plate of the vehicle (or other vehicle identifier) may be scanned as the user is leaving the garage or guard station. The enterprise server may detect that the user is leaving and send a message to the enterprise device to begin shutdown or logoff procedures, depending on company policy, the user profile, or a combination.

A user may present an RFID enabled badge to an RFID reader. The reader may collect badge information and transmit the information to an enterprise server. The enterprise server may use the information from the badge and initiate startup processes at one or more enterprise devices. In some embodiments, when the user scans the badge, an image or other biometric information is collected by a detector and sent to the enterprise server. The enterprise server may identity of the user using the badge and verify the user's identity using the biometric information (or vice versa).

When a location-aware device (e.g., security card, mobile device) of a user enters or exits a geo-fenced area, a notification may be sent to the enterprise server. The notification may indicate an exact position of the user (e.g., user entering south side of building). This information may be used to determine which enterprise device to contact to initialize the startup procedure. In some embodiments, the location of a mobile device may be tracked without a geo-fence and used to determine when the enterprise device should begin start-up processes.

In some embodiments, an enterprise device may detect the physical presence of the user. For example, when the user comes in close contact with the enterprise device (e.g., walking into an office), the enterprise device may initiate the startup process. The enterprise device may initiate the startup process without sending a message to the enterprise server of the enterprise device may send a message to the enterprise server and receive instructions regarding startup.

In some embodiments, according to a calendar of a user, the user has a meeting in a conference room. When the user enters in the conference room, the enterprise device in the conference room could detect the presence of the user and initiate startup processes for the user. Or, when the user locks an enterprise device or leaves the vicinity of the enterprise device, a startup process for the enterprise device in the conference room may be initiated.

Figure 5:
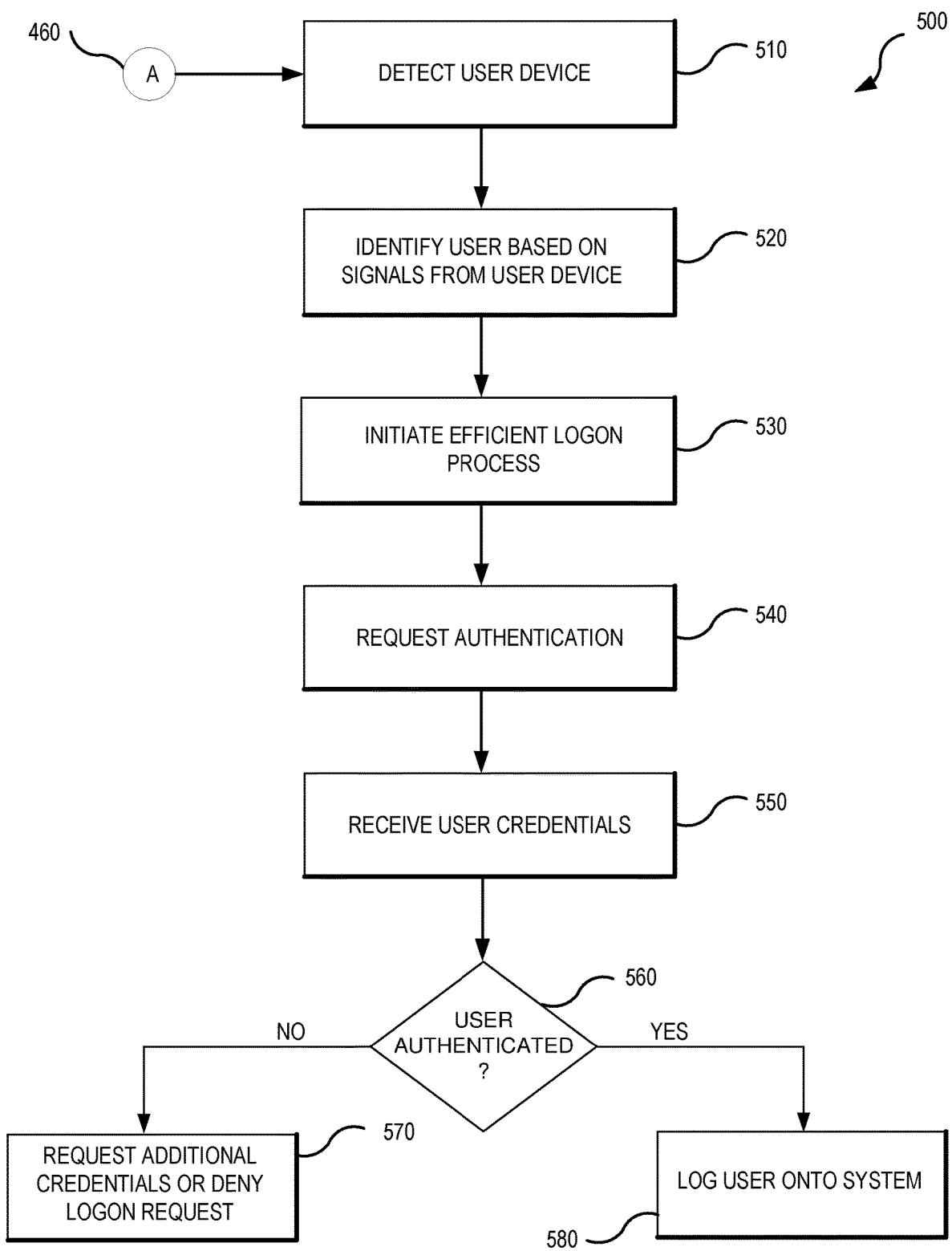
FIG. 5 is a flowchart illustrating a set of operations for efficiently logging a user onto a system in accordance with various embodiments of the present disclosure.

FIG. 5 is a flowchart illustrating a set of operations for efficiently logging a user onto an enterprise system in accordance with various embodiments of the present disclosure. The operations can be performed by various components such as one or more processors 310, detector 315, user profile module 330, authentication request module 335, quick-logon module 340, PKI certificate module 345, comparer 350, validator 355, logon module 360, GUI generation module 365, employee database 225, enterprise devices 235A-N, user device 210, and/or other components.

In some embodiments, the enterprise device has been initialized for the user in continuing operation 460. During detection operation 510, the user device may be detected by the enterprise device using, for example, short range communications. More than one user device may be detected. A list of the user devices detected may be displayed. One of the user devices may be selected. Identification operation 520 can identify the user based on communications or signals sent from the user device to the enterprise device. Using initiating operation 530, a user profile may be accessed based on the identification, which may indicate the level of authentication or the type of process used to log the user on. During requesting operation 540, the enterprise device may request additional authentication information. For example, the enterprise device may request a voice command, word, or PIN. In some embodiments, a PIN or other identifier may be used in connection with the quick-logon process described above or with the PKI certification process.

During receiving operation 550, the user's credentials are received. Decision block 560 determines whether the user is authenticated. If the user fails to provide sufficient credentials, decision block 560 branches to reject operation 570 where the user is not logged on. In reject operation 570, the user may be asked to provide additional information or the user may be prevented from logging on. If the user has provided sufficient credentials, decision block 560 branches to logon operation 580 where the user is logged on and authenticated. In some embodiments, the system can implement "confirmation" where the user and/or device may be authenticated passively but the user is required to affirmatively respond that the user wants to be logged in (e.g., by clicking "confirm" before the user is logged onto the enterprise device). The confirmation process can also include the concept of "shared image" to ensure the user is logging on to the correct device.

Figure 6:
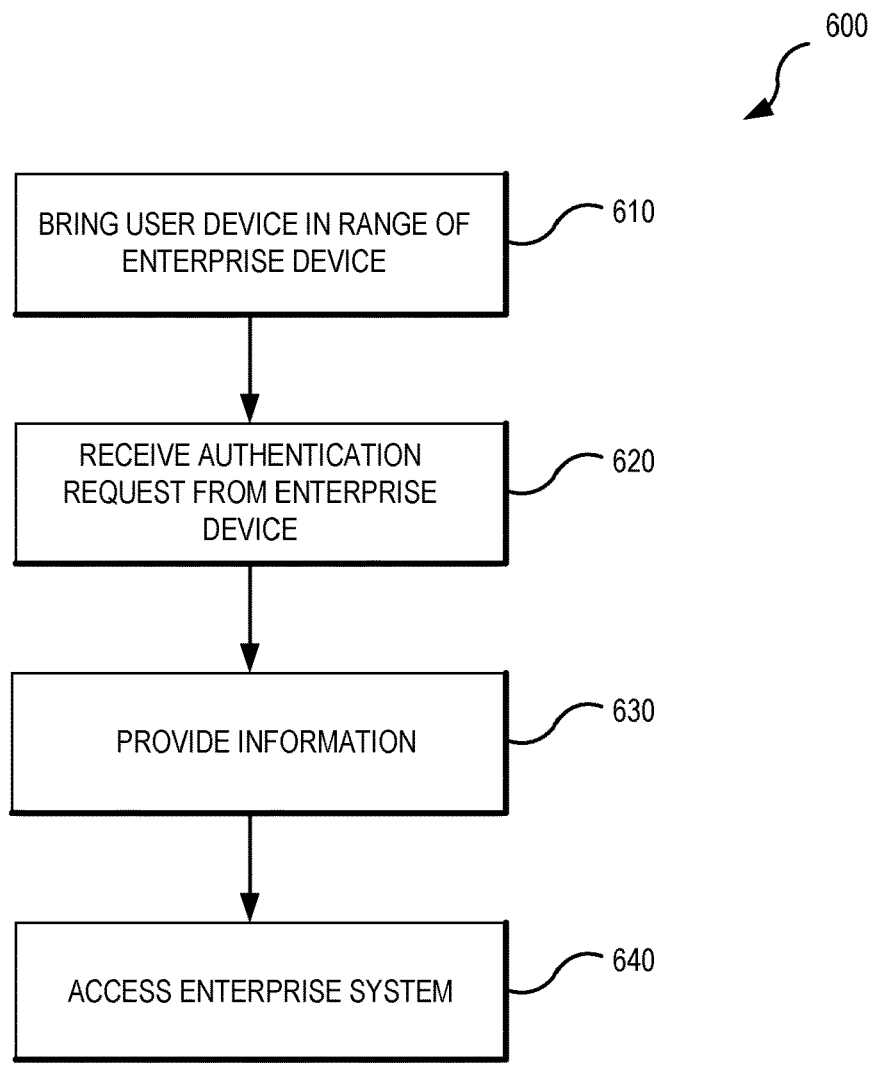
FIG. 6 is a flowchart illustrating a set of operations for efficiently logging a user onto a system in accordance with various embodiments of the present disclosure.

FIG. 6 is a flowchart illustrating a set of operations for efficiently logging a user onto an enterprise system in accordance with various embodiments of the present disclosure. The operations can be performed by various components such as one or more processors 310, detector 315, communications module 320, user profile module 330, authentication request module 335, quick-logon module 340, PKI certificate module 345, comparer 350, validator 355, logon module 360, GUI generation module 365, employee database 225, enterprise devices 235A-N, efficient startup and logon system 220, user device 210, and/or other components.

In range operation 610, a user may bring a user device such as a mobile device or an identification card into the range of detection of an enterprise device. In authentication operation 620, the user may be asked to provide information such as a PIN or password. After the user provides the information in providing operation 630, the user may be logged in and granted access to the enterprise system in accessing operation 640. In some embodiments, the user device will provide information to validate itself, such as a digital certificate and/or a token.

In some embodiments, the enterprise device may detect that the user is outside the detectable range of the enterprise device. After a period of time, such as over a minute, the enterprise device may automatically lock the user's computer. This action may be based upon the time of day or the date. For example, in some embodiments, if it is outside of work hours, the enterprise device may automatically log the user off after a predetermined period of time of the user being outside of the range of the enterprise device. In some embodiments, the enterprise device may automatically download updates and restart the computer depending on the date.

Computer System Overview

Figure 7:
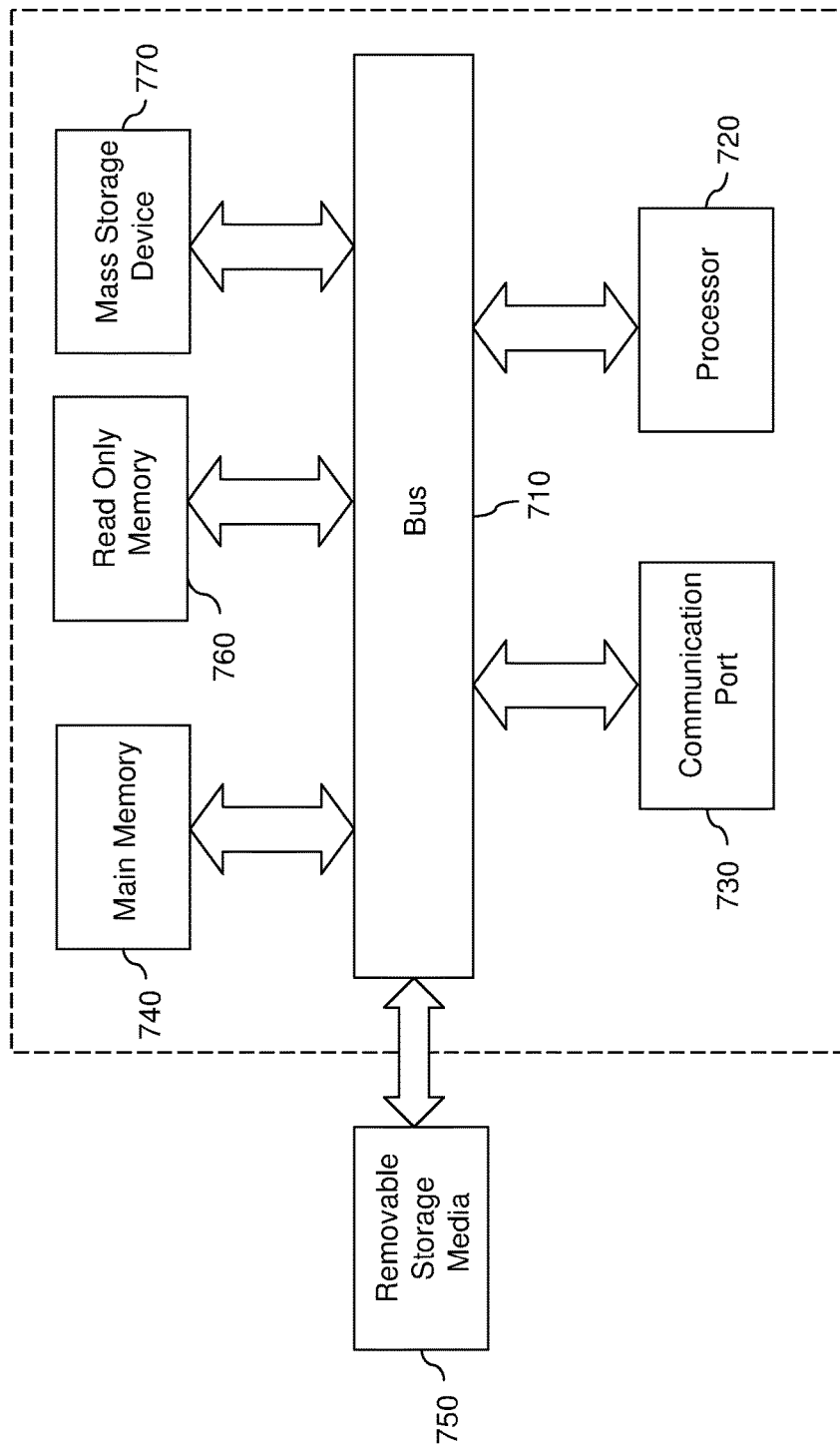
FIG. 7 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 7 is an example of a computer system 700 with which embodiments of the present disclosure may be utilized. According to the present example, the computer system includes a bus 710, at least one processor 720, at least one communication port 730, a main memory 740, a removable storage media 750, a read only memory 760, and a mass storage 770.

Processor(s) 720 can be any known processor, such as, but not limited to, an Intel® Itanium® or Itanium 2® processor(s); AMD® Opteron® or Athlon MP® processor(s); or Motorola® lines of processors. Communication port(s) 730 can be any of an RS-232 port for use with a modem-based dialup connection, a 10/100 Ethernet port, or a Gigabit port using copper or fiber. Communication port(s) 730 may be chosen depending on a network such as a Local Area Network (LAN), Wide Area Network (WAN), or any network to which the computer system 700 connects.

Main memory 740 can be Random Access Memory (RAM) or any other dynamic storage device(s) commonly known in the art. Read only memory 760 can be any static storage device(s) such as Programmable Read Only Memory (PROM) chips for storing static information such as instructions for processor 720.

Mass storage 770 can be used to store information and instructions. For example, hard disks such as the Adaptec® family of SCSI drives, an optical disc, an array of disks such as RAID, such as the Adaptec® family of RAID drives, or any other mass storage devices may be used.

Bus 710 communicatively couples processor(s) 720 with the other memory, storage and communication blocks. Bus 710 can be a PCI/PCI-X or SCSI based system bus depending on the storage devices used.

Removable storage media 750 can be any kind of external hard-drives, floppy drives, IOMEGA® Zip Drives, Compact Disc-Read Only Memory (CD-ROM), Compact Disc-Re-Writable (CD-RW), and/or Digital Video Disk-Read Only Memory (DVD-ROM).

The components described above are meant to exemplify some types of possibilities. In no way should the aforementioned examples limit the scope of the disclosure, as they are only examples.

In conclusion, embodiments of the present disclosure provide novel systems, methods and arrangements for efficient startup and logon. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features.

What is claimed is:

1. A computerized method comprising:
receiving, at a first device, a command to initiate startup processes on the first device,
wherein the command is sent in response to a detection of a physical presence of a second device, wherein the second device is associated with a user,
wherein a geo-fence surrounds an area, and wherein the physical presence of the second device is detected when the second device associated with the user enters or leaves the area surrounded by the geo-fence;
in response to receiving the command to initiate the startup processes, launching at least one application on the first device;
receiving, at the first device, verification of authentication credentials; and
providing, to the user, access to the first device upon receiving the verification of the authentication credentials, wherein the startup processes are initiated prior to the verification of the authentication credentials.

2. The computerized method of claim 1, further comprising verifying the authentication credentials at the first device.

3. The computerized method of claim 1, further comprising:
sending, to a server, the authentication credentials; and
receiving, from the server, the verification of the authentication credentials.

4. The computerized method of claim 1, further comprising sending a message to a mobile device associated with the user notifying the user that the startup processes are complete.

5. The computerized method of claim 4, wherein the mobile device is the second device.

6. The computerized method of claim 1, wherein the server initializes the startup processes defined in a user profile, and wherein the computerized method further comprises locking the first device in a name of the user.

7. The computerized method of claim 1, wherein the startup processes are initialized a period of time after receiving the detection, and wherein the period of time is defined in a user profile associated with the user.

8. The computerized method of claim 1, wherein a user profile includes a user-selectable setting that inhibits initiating the startup processes.

9. The computerized method of claim 1, further comprising determining a time to initiate the startup processes based on a physical location of the user, wherein the physical location of the user is determined by the physical presence of the second device.

10. The computerized method of claim 1, further comprising:
    receiving a detection that the user is exiting the area; and
    initiating a logoff process.

11. The computerized method of claim 1, further comprising monitoring, by a network of detectors, for an indication of the physical presence of the second device, wherein a first detector in the network of detectors sends first information to identify an identity of the user, and wherein a second detector in the network of detectors sends second information to verify the identity of the user.

12. The computerized method of claim 1, further comprising monitoring, by a network of detectors, for an indication of the physical presence of the second device associated with the user, wherein the network of detectors comprises a radio-frequency identification reader, wherein the method further comprises:
    scanning, by the radio-frequency identification reader, a badge of the user; and
    transmitting information scanned from the badge of the user, wherein the information scanned from the badge is used at least in part to detect the physical presence of the second device.

13. A non-transitory computer-readable storage medium containing a set of instructions that, when executed by one or more processors, cause a machine to:
    receive, at a first device, a command to initiate startup processes on the first device,
    wherein the command is sent in response to a detection of a physical presence of a second device, wherein the second device is associated with a user,
    wherein a geo-fence surrounds an area, and wherein the physical presence of the second device is detected when the second device associated with the user enters or leaves the area surrounded by the geo-fence;
    in response to receiving the command to initiate the startup processes, launch at least one application on the first device;
    receive, at the first device, verification of authentication credentials; and
    provide, to the user, access to the first device upon receiving the verification of the authentication credentials, wherein the startup processes are initiated prior to the verification of the authentication credentials.

14. The non-transitory computer-readable storage medium of claim 13, wherein the set of instructions, when executed by the one or more processors, further causes the machine to:
    receive a detection that the user is exiting the area; and
    initiate a logoff process.

15. The non-transitory computer-readable storage medium of claim 13, wherein the startup processes are initialized a period of time after receiving the detection, and wherein the period of time is defined in a user profile associated with the user.

16. The non-transitory computer-readable storage medium of claim 13, wherein the set of instructions, when executed by one or more processors, further causes the machine to determine a time to initiate the startup processes based on a physical location of the user, wherein the physical location of the user is determined based on the physical presence of the second device.

17. A computer system comprising:
    at least one processor;
    at least one memory comprising instructions configured to cause the at least one processor to perform a method comprising:
    receiving, at a first device, a command to initiate startup processes on the first device,
        wherein the command is sent in response to a detection of a physical presence of a second device, wherein the second device is associated with a user,
        wherein a geo-fence surrounds an area, and wherein the physical presence of the second device is detected when the second device associated with the user enters or leaves the area surrounded by the geo-fence;
    in response to receiving the command to initiate the startup processes, launching at least one application on the first device;
    receiving, at the first device, verification of authentication credentials; and
    providing, to the user, access to the first device upon receiving the verification of the authentication credentials, wherein the startup processes are initiated prior to the verification of the authentication credentials.

18. The system of claim 17, wherein the method further comprises determining a time to initiate the startup processes based on a physical location of the user, wherein the physical location of the user is determined by the physical presence of the second device.

* * * * *